(12) United States Patent
Nathoo et al.

(10) Patent No.: US 7,412,599 B1
(45) Date of Patent: Aug. 12, 2008

(54) ADMINISTRATIVE REMOTE NOTIFICATION SYSTEM AND METHOD

(75) Inventors: Karim Nathoo, Ottawa (CA); Tim Bramble, Ottawa (CA); Shan Syed, Ajax (CA)

(73) Assignee: Entrust Technologies Limited, Ottawa, Ontario (CA)

( * ) Notice: Subject to any disclaimer, the term of this patent is extended or adjusted under 35 U.S.C. 154(b) by 1683 days.

(21) Appl. No.: 09/730,547

(22) Filed: Dec. 7, 2000

(51) Int. Cl.
*H04L 9/00* (2006.01)
*G06F 7/00* (2006.01)
*G06F 15/40* (2006.01)
*H04M 3/42* (2006.01)

(52) U.S. Cl. .................. 713/156; 713/177; 707/6; 707/9

(58) Field of Classification Search .......... 713/156, 713/175, 176, 177, 178, 158; 380/25, 30; 709/223, 225, 229
See application file for complete search history.

(56) References Cited

U.S. PATENT DOCUMENTS 6,367,013 B1 * 4/2002 Bisbee et al. ............. 713/158
6,490,679 B1 * 12/2002 Tumblin et al. ............ 713/155
6,725,240 B1 * 4/2004 Asad et al. ................ 707/202

FOREIGN PATENT DOCUMENTS

EP 449568 A2 * 10/1991

OTHER PUBLICATIONS

"A Classification-based Methodology for Planning Audit Strategies in Fraud Detection", F. Bonchi, F. Giannotti, G. Mainetto, D. Pedreschi, 1999, ACM, pp. 175-184.*
"Baltimore Products: UniCERT Features: Operational Controls", htlp://www.baltimoreinc.com/products/unicert/opcontrols.html, printed on Oct. 12, 2000, pp. 1-3.*
"S/MIME Version 3 Certificate Handling", dated Jun. 1999, http:/www.ietf.org/rfc/rfc2632, printed on Jan. 16, 2001, pp. 1-13.*
"S/MIME Version 3 Certificate Handling", dated Jun. 1999, http://www.ietf.org/rfc/rfc2632, printed on Jan. 16, 2001, pp. 1-13.*
UniCERT | Policy Support, http://www.baltimoreinc.com/products/unicert/opcontrols.html, printed on Oct. 12, 2000, pp. 1-13.*

(Continued)

*Primary Examiner*—Emmanuel L Moise
*Assistant Examiner*—Courtney D Fields

(57) ABSTRACT

Apparatus and method are provided for performing remote notification of records, each having a respective record identifier. A record-user mapping associates with each record identifier a respective one or more user names. For each record upon which remote notification is to be performed the respective one or more user names is obtained from the record-user mapping, and for each obtained user name a respective addressable entity is obtained from a user name-addressable entity mapping. A notification of the record is sent to the addressable entity. Target record processing may also be provided. For each record identifier for which target record processing is to be performed, a target user name is read from the associated record, a respective addressable entity is obtained from the user name-addressable entity mapping, and a notification of the record is sent to the addressable entity.

51 Claims, 3 Drawing Sheets

OTHER PUBLICATIONS

"Internet X.509 Public Key Infrastructure Certificate and CRL Profile", dated Jan. 1999, http://www.ietf.org/rfc/rfc2459, printed on Jan. 16, 2001, p. 1.

"S/MIME Version 3 Certificate Handling", dated Jun. 1999, http://www.ietf.org/rfc/rfc2632, printed on Jan. 16, 2001, p. 1.

* cited by examiner

ADMINISTRATIVE REMOTE NOTIFICATION SYSTEM AND METHOD

FIELD OF THE INVENTION

The invention relates to methods and systems which process records, for example audit records produced by a certificate management system.

BACKGROUND OF THE INVENTION

It is common in private networks to provide a means of encryption by which users of the network can communicate with each other securely. For example, some networks feature a certificate management system such as a PKI (Public Key Infrastructure) which administers the distribution of published certificates which contain public keys for individuals within an organization. This allows a user to encrypt data using the public keys, send it to the user at the other end, after which the other user can use his private key to decrypt the data.

In such networks, it is common to have one or more servers administering the certificate management system, and in the process of doing this typically audit records are generated and are stored in an audit record repository. The particular nature of the audit records generated depends upon system implementation. However, an audit record might for example be generated when various types of error events occur. The audit records may also include audit records generated for the purpose of monitoring system use. For example, an audit record could be generated whenever an administrator logs into an administration too. Typically, system administrators access the audit record repository through an administrative interface of some sort, and download the audit records to their local platform to review them and identify any action necessary. Unfortunately, this is not a very efficient mechanism for getting any action to take place as a result of an audit record. Firstly, the system administrator must remember to download the audit records. They must also take the time to scroll through each of the audit records to identify whether they are responsible for any of them and follow this up with whatever the necessary action might be. Furthermore, certain audit records might occur due to events that a system administrator was responsible for, such as might be the case in which there was a rogue administrator in a system which was attempting to damage the system or circumvent the security somehow.

Thus, the problem exists that not only are audit records not currently effectively distributed, but there is the potential security problem which might arise in the event there is a rogue administrator attempting to undermine the security of the system.

SUMMARY OF THE INVENTION

The invention, in accordance with a broad aspect, provides a method of performing remote notification of records, such as audit records, each having a respective record identifier. The method involves maintaining a record-user mapping which associates with each of a plurality of record identifiers a respective one or more user names. For each record upon which remote notification is to be performed the record's record identifier's respective one or more user names is obtained from the record-user mapping. For each user name in the record's record identifier's respective one or more user names a respective addressable entity is obtained from a user name-addressable entity mapping and a notification of the record is sent to the addressable entity.

Preferably, the user name-addressable entity mapping is a trusted mapping. Also, preferably the method is adapted to perform remote notification of audit records generated by a certificate management system. In this case, the addressable entities may be stored in a certificate repository, for example a directory of published certificates. The certificate management system might for example be a PKI (Public Key Infrastructure). The method may further include the maintenance of the published certificate repository for example in accordance with the X.500 series of recommendations. The addressable entities may be stored in a certificate extension field of the certificates, for example the subject alternative name certificate extension.

Preferably, the addressable entity is an E-mail address. Also preferably each user name is a distinguished name in accordance with X.500.

Preferably, a new set of records, the set also being referred to as a log, is obtained for processing from time to time. Record reading parameters may be stored for the purpose of determining the circumstances under which the new set of records for processing is to be obtained.

Preferably the method is further enhanced to include target record processing. For this, as least one record identifier is identified for which target record processing is to be performed. The target record processing involves for each record identifier for which target record processing is to be performed reading from the associated record a target user name, obtaining from the user name-addressable entity mapping a respective addressable entity for the target user name and sending a notification of the record to the addressable entity. Another broad aspect of the invention provides this target audit record processing method per se.

The invention according to another broad aspect provides an apparatus for performing remote notification of records. The apparatus has a record-user mapping memory structure which associates for each of a plurality of record identifiers a respective one or more user names. There is a receiving interface for receiving a set of records to be processed for remote notification, each record having a respective record identifier, and a notification interface adapted to send messages to addressable entities. There is a record processing entity adapted to process the set of records by obtaining the record's record identifier's respective one or more user names from the record-suer mapping, and for each user name in the record's record identifier's respective one or more user names obtaining from a user name-addressable entity mapping a respective addressable entity and sending a notification of the record to the addressable entity through the notification interface.

Preferably, in addition to or alternatively to the record-user name memory structure, there may be provided a target record memory structure adapted to contain an identification of at least one record identifier for which target record processing is to be performed as described previously.

Advantageously, these methods and apparatus allow the remote notification of records to occur without the need for an interested user to remember to collect the records. Also, advantageously for embodiments featuring target record processing, by notifying the target of an operation which resulted in a record, rogue operations for example by system administrators, can easily be detected and addressed.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
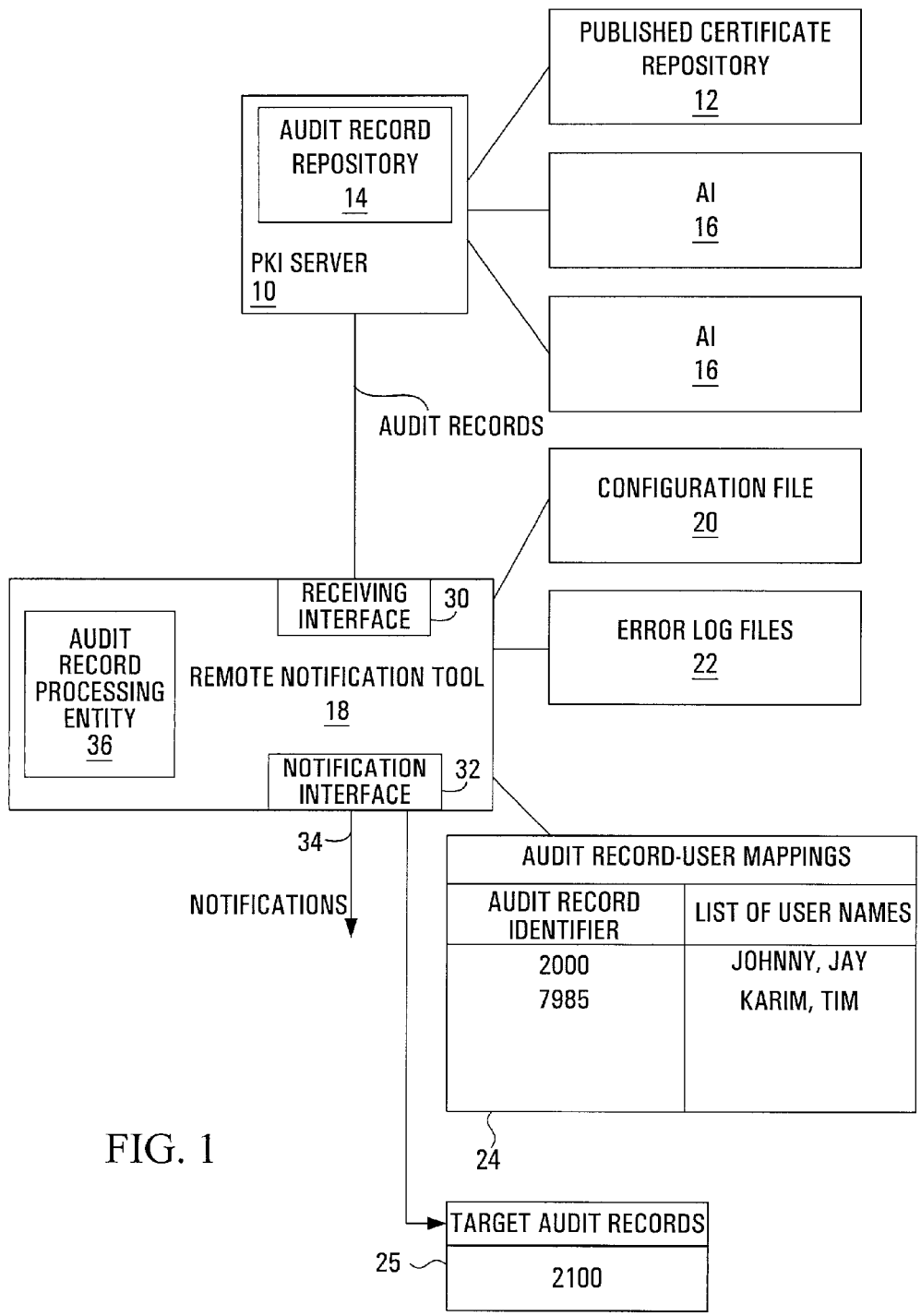
FIG. 1 is a block diagram of a system featuring a remote notification tool provided by an embodiment of the invention.

An embodiment of the invention will now be described with reference to FIG. 1 which provides administrative remote notification of records. In a preferred embodiment these records are generated by a certificate management system, such as a PKI (Public Key Infrastructure). For the purpose of this example, it is assumed that the records are generated by a PKI server. FIG. 1 shows a PKI server 10 which is responsible for implementing the PKI solution over a network (not shown). The network might for example include a number of user work stations with which users can communicate securely with each other using the security features provided by the PKI server 10. The PKI server 10 is connected to a certificate repository 12 which might for example be a directory of published certificates. The repository 12 provides access to the published certificates generated by the PKI server 10, and this will include public key information. The PKI server 10 is also shown containing an audit record repository 14. This repository is maintained by the PKI server, and contains a compilation of audit records as they occur. This might be in the form of a single record for each audit record. An audit record might for example have the following format: {audit record identifier, severity, audit record message, target}.

The audit record identifier is any numerical or otherwise identifier of the audit record. The severity field is an optical field identifying how serious this particular audit record is. The audit record message and information field simply contain textual information relating to the audit record. The target field is an optical field identifying a target user name of an action which took place which generated the audit record.

In one embodiment, the published certificate repository 12 publishes certificates in a hierarchical manner, for example in accordance with the X.500 series of recommendations. Alternatively, the published certificate resspository 12 can be arranged in any convenient fashion. The certificates may be stored in a database, in an LDAP (lightweight directory access protocol) directory, in file based storage, or in Microsoft's Active Directory, to name a few examples. The X.500 series of recommendations allows for the inclusion of a unique user name for each user referred to as a "distinguished name", or DN. It is also possible to include additional information for each user in certificate extensions, such as the "subject alternative name" extension provided by the X.500 series of recommendations. RFC 2459 (available from the Internet Engineering Task Force (IETF)) provides a profile of using the X.509 recommendation for Internet PKI. Conventional uses for the subject alternative name extension are described in RFC 2632 (also available from the IETF) which details the use of the subject alternative name extension in S-MIME. In this embodiment of the invention, a certificate extension and preferably the subject alternative name extension is used to store an addressable entity in association with each user name. The addressable entity might for example be the user's e-mail address, but it might alternatively be some other type, for example, a user's alphanumeric pager identifier. More generally, the addressable entity might be any identification of a contact channel to the particular user. Rather than the use of a certificate extension in a published certificate repository, more generally some sort of user name-addressable entity mapping needs to be made available, and preferably this is a trusted mapping in the sense that the information it contains can be trusted.

Referring back to FIG. 1, system administrators access the audit record repository 14 through administrative interfaces 16 (two shown). The PKI server 10 might also be equipped to function as an administrative interface 16. Also shown is a remote notification tool 18 connected to the PKI server 10. The remote notification tool 18 is a completely new component designed to process the audit records in the audit record repository 14 and efficiently distribute them to the administrative interfaces 16 and in some cases to other system users. The remote notification tool 18 may have a configuration file 20 stored internally or externally used to configure the remote notification tool's behaviour through audit record reading parameters for example. It might also generate error log files 22.

The remote notification tool maintains an audit record-user mapping 24 which contains mappings from user names to/from audit record numbers. For each different audit record identifier the audit record-user mapping 24 indicates one or more user names which are to be notified upon the occurrence of an audit record having that audit record identifier. For example, a particular system administrator might be interested in knowing about all records pertaining to the creation of a new user verification certificate, and any records relating to this would have their audit record identifier included in the audit record-user mapping 24 each identifying that the particular system administrator's user name is to be notified upon the occurrence of that record.

Also shown is a list of target audit records 25 which has entries each containing an identification of particular audit record identifier which, when it occurs, is to be processed by target audit record processing which consists of identifying the target of the event which caused the audit record and sending a notification to that target. The same audit record identifier can appear in both the audit record-user mapping 24 and the list of target audit records 25.

For example, the audit record-user mapping might have the following structure:

| AUDIT RECORD IDENTIFIER | LIST OF USER NAMES |
|---|---|
| 2000 | JOHNNY, JAY |
| 7985 | KARIM, TIM |

The list of target audit records 25 might have the following structure:

| TARGET AUDIT RECORDS |
|---|
| 2100 |

The two sets of records are combinable by providing a flag to indicate if an audit record identifier is a user-event as follows:

| AUDIT RECORD IDENTIFIER | USER EVENT? | LIST OF USER NAMES |
|---|---|---|
| 2000 | N | JOHNNY, JAY |
| 2100 | Y | — |
| 7985 | N | KARIM, TIM |

More generally, any suitable physical and/or logical memory structure(s) may be used to store the target user event entries and the audit record-user mapping entries, including but not limited to file(s), RAM, ROM, etc. For example, rather than mapping each audit record identifier to one or more user names, each user name could be mapped to one or more audit record identifiers. Returning again to the configuration file 20, this contains audit log reading parameters identifying the location of the audit records, and might also include for example information identifying how often the remote notification tool 18 should query the audit record repository 14 for new audit records for processing for remote notification.

The remote notification tool 18 has a receiving interface 30 through which to receive/request audit records from the PKI server 10. In the event the remote notification tool 18 is on the same physical machine as the audit record repository 14, this would be a software interface. There is a notification interface 32 through which notifications 34 are sent. This might be an E-mail message sending component. There is also a record processing entity 36 which is any combination of hardware, software, firmware capable of processing records as described in detail below.

The remote notification tool 18 processes the audit records read from the audit record repository 14 and distributes these to users within the system which may include users of the administrative interfaces 16, but not necessarily.

Figure 2:
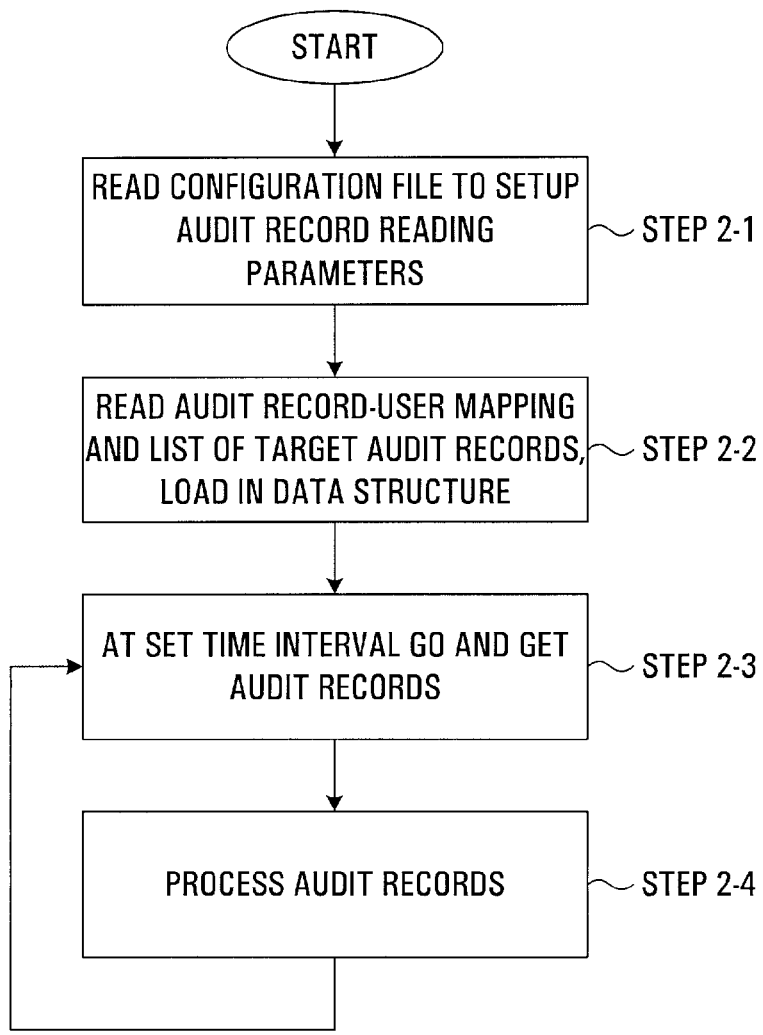
FIG. 2 is a flowchart of steps taken to process groups of audit records by the remote notification tool of FIG. 1.

A flowchart of the functionality implemented by the remote notification tool 18 is shown in FIG. 2. To begin, the remote notification tool reads the configuration file 20 and sets up the audit record reading parameters at step 2-1. Next, the remote notification tool 18 reads in the audit record-user mapping 24, and the list target of audit records 25 and preferably loads this into some sort of quickly accessible data structure (step 2-2). At step 2-3, from time to time and preferably at a time interval determined by the parameters in the configuration file, the remote notification tool fetches a set of the audit records from the audit record repository 14, for example all records for a given time interval. It is noted that the same remote notification tool 18 might be used to process audit records from more than one PKI server 10.

Next, at step 2-4, the remote notification tool 18 processes the audit records thus read. The processing of audit records will be described below with reference to the flowchart of FIG. 3. The remote notification tool 18 then continues implementing step 2-3 and step 2-4 at time intervals determined by the audit record reading parameters.

Typically, the PKI server 10 will include some kind of API (Application Interface, not shown) providing a defined mechanism for reading audit records from the audit record repository 14. For example, the API might allow a request specifying two times $T_1$-$T_2$ to be received in response to which a list of all the audit records in the audit record repository 14 having time stamps between these two times is generated and sent to the requestor in this case the remote notification tool 18.

Figure 3:
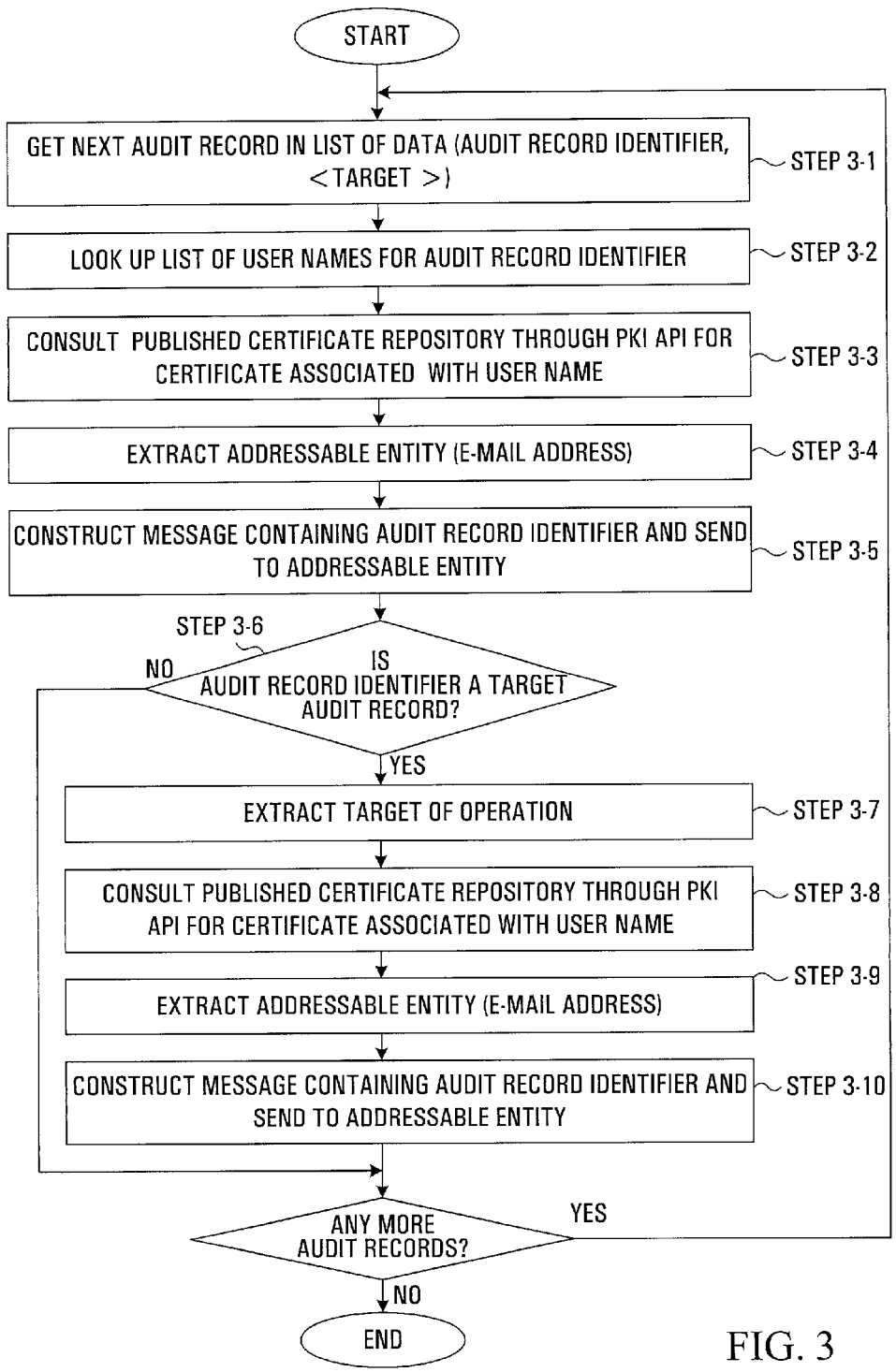
FIG. 3 is a flowchart expanding upon the details of step 2-4 of FIG. 2 showing steps taken to process individual audit records by the remote notification tool of FIG. 1.

The details of step 2-4 of FIG. 2 will now be expanded upon with reference to FIG. 3 which is a flowchart for the processing of audit records. In step 3-1 the next audit record in the list of audit records downloaded from the audit record repository is examined, and the audit record identifier and any target identifiers in the audit record are extracted. The audit record may contain additional information. Next the audit record-user mapping file 24 is consulted for a list of all user names associated with the particular audit record identifier (step 3-2). As indicated previously, these might be DNs. In step 3-3, the remote notification tool 18 consults the published certificate repository 12 through the PKI server's 10 API for the certificates stored in association with each user name identified in association with the audit record identifier. Typically, a PKI server's API will include this capability since when a user wishes to send something to another user that user must be able to access another user's certificate and this would be done through the API.

Preferably, the entire certificate is obtained in order to achieve a trusted mapping. A digital signature is placed on the entire certificate by a CA (Certification Authority) when it is written to the repository. The goal of the digital signature is to verify the integrity of the certificate contents. Before the certificate information is used by another party, in this case the remote notification tool 18, this party will verify the digital signature using a public key operation involving the CA's public key. If the signature verifies, the party wishing to use the certificate can be assured of the integrity of its contents as well as the fact that it was actually the CA that signed the certificate. In order to verify this signature, the whole certificate is required, rather than just the extracted e-mail address.

The addressable entity is extracted from the certificate (step 3-4) for example from the subject alternative name extension as described previously if this approach is employed. This might for example be the e-mail address for the particular user. In step 3-5, a message is constructed containing the audit record identifier and this is sent to the addressable entity.

The notification message sent may include more than just the audit record identifier. For example, it may include some or all of the audit record details. In some embodiments, the notification message is encrypted and/or signed with a digital signature. In another embodiment, some or all of the audit record details to be included in the notification message are translated to another language, the language being particular to the recipient of a given notification message. This can be achieved by maintaining a table of audit record text for each audit record identifier in each language required, and maintaining an identification of a language in which each user expects to receive audit records.

In the event the addressable entity is an e-mail address, the notification message would constitute an e-mail message. In the event the addressable entity is some other type of address, then the message would have to be created in the format required by that address type. For example, if the addressable entity was a pager number, then the message would have to be constructed as a alphanumeric page. Steps 3-3, 3-4 and 3-5 are all repeated for each distinguished name identified in the audit-user mapping file 24 in association with the audit record identifier. Next, the audit record identifier is examined to determine if it is a target audit record (step 3-6). In the event the audit record identifier is not a target audit record, then this would end the processing to be performed for that particular audit record. On the other hand, if the audit record identifier is identified as being a target audit record, then the target of the operation is extracted in step 3-7, and the steps of consulting the certificate repository through the PKI API (step 3-8), extracting the addressable entity from the certificate (step 3-9) and constructing a message in the suitable format and sending it to the addressable entity (step 3-10) are performed for the target or in the event there is more than one target for each target. That ends the processing of a given record in the downloaded list of audit records.

Below is an example of the information which might be contained in an audit record, in this case an audit record generated by Entrust's PKI 5.0 product. In this case the audit record occurred because an administrator was logged into an administration tool. If the audit record-user mapping contained a DN with the event number of this audit (7965) following it, then this DN would be notified.

Audit Number: 295
Audit Time: Tue Aug 8 17:26:27 2000
Event Number: 7965
Severity: 0
Admin Name: Admin(s) cn=First Officer, o=companyA, c=CA
Done To Name:
Extra Info: 47.97.233.150
State: 0
Event Description: (-7965) Successful Administrator login.

Below is another example of an audit record. In this case, the audit record is one that target audit record processing can be performed on. Note that the field "Done To Name" contains the DN of the user who the action was performed on. In this case, a suer certificate extension (the specific extension is subject alternative name) was changed. An administrator has gone into the certificate belonging to cn=Demo User3, o=entrust, c=CA and changed the email address in the subject alternative name extension from test.dummy@companyA.com to testUser@abd.com. Similar events may be generated when other certificate attributes are changed.

Audit Number: 332
Audit Time: Wed Aug 9 11:40:56 2000
Event Number: 7840
Severity: 1
Admin Name: Admin(s) cn=First Officer, o=entrust, c=CA (1)
Done To Name: cn=Demo User3, o=entrust, c=CA
Extra Info: changed from: test.dummy@companyA.com to: TestUser@abd.com
State: 0
Event Description: (-7840) User alternate name information changed.

It is to be noted that various embodiments of the invention may include only the audit record-user processing, only the target audit record processing, or both audit recording-user processing and target audit record processing.

Numerous modifications and variations of the present invention are possible in light of the above teachings. It is therefore to be understood that within the scope of the appended claims, the invention may be practised otherwise than as specifically described herein.

We claim:

1. A method of performing remote notification of records each having a respective record identifier, the method comprising:
   maintaining a record-user mapping which associates with each of a plurality of record identifiers a respective one or more user names;
   for each record upon which remote notification is to be performed:
   a) obtaining the record's record identifier's respective one or more user names from the record-user mapping;
   b) for each user name in the record's record identifier's respective one or more user names obtaining from a user name-addressable entity mapping a respective addressable entity and sending a notification of the record to the addressable entity.

2. A method according to claim 1 further comprising maintaining the user name-addressable entity mapping from each user name to the respective addressable entity.

3. A method according to claim 2 wherein the user name-addressable entity mapping is a trusted mapping.

4. A method according to claim 1 adapted to perform remote notification of records generated by a certificate management system, wherein obtaining from a user name-addressable entity mapping a respective addressable entity comprises obtaining a respective addressable entity from a respective certificate stored in a repository of published certificates.

5. A method according to claim 4 wherein the certificate management system comprises a PKI (Public Key Infrastructure).

6. A method according to claim 4 further comprising:
   maintaining the repository of published certificates in which is stored for each of a plurality of user names the respective certificate in which is identified the respective addressable entity.

7. A method according to claim 1 wherein the addressable entity is an E-mail address.

8. A method according to claim 1 wherein each user name is a distinguished name.

9. A method according to claim 4 further comprising for each certificate storing the respective addressable entity in a certificate extension field of the certificate.

10. A method according to claim 9 wherein storing the respective addressable entity in a certificate extension field of the certificate comprises storing the respective addressable entity in a subject alternative name extension.

11. A method according to claim 4 further comprising obtaining a new set of records for processing, and conducting steps a) and b) for each record in the new set of records.

12. A method according to claim 10 further comprising storing record reading parameters which determine circumstances under which the new set of records for processing is to be obtained, and obtaining the new set of records for processing in accordance with the record reading parameters.

13. A method according to claim 1 further comprising protecting each notification message by encryption and/or digital signature.

14. A method according to claim 4 further comprising protecting each notification message by encryption and/or digital signature.

15. A method according to claim 4 further comprising verifying authenticity of the respective certificate before sending the notification to the addressable entity obtained from the respective certificate.

16. A method according to claim 1 further comprising maintaining an identification of a language of choice for each user name, before sending a notification to an addressable entity obtained for a particular user name, determining the particular user name's language of choice and including a translation of text in the notification message into the language of choice.

17. A method according to claim 1 further comprising:
   identifying at least one record identifier for which target audit record processing is to be performed, the target audit record processing comprising:
   for each record identifier for which target audit record processing is to be performed reading from the associated record a target user name, obtaining from the user name-addressable entity mapping a respective addressable entity for the target user name and sending a notification of the record to the addressable entity.

18. A method according to claim 4 further comprising:
identifying at least one record identifier for which target record processing is to be performed, the target audit record processing comprising:
for each record identifier for which target record processing is to be performed reading from the associated record a target user name, obtaining from the repository of published certificates a respective addressable entity for the target user name and sending a notification of the record to the addressable entity.

19. A method of performing remote notification of records each having a respective record identifier, the method comprising:
identifying at least one record identifier for which target record processing is to be performed, the target audit record processing comprising:
for each record identifier for which target record processing is to be performed reading from an associated record a target user name which identifies a user name which was a target of an operation which resulted in the record, obtaining from a user name-addressable entity mapping a respective addressable entity for the target user name and sending a notification of the record to the addressable entity.

20. A method according to claim 19 further comprising maintaining the user name-addressable entity mapping from each user name to the respective addressable entity.

21. A method according to claim 20 wherein the user name-addressable entity mapping is a trusted mapping.

22. A method according to claim 19 adapted to perform remote notification of records generated by a certificate management system, wherein obtaining from a user name-addressable entity mapping a respective addressable entity comprises obtaining the respective addressable entity from a respective certificate stored in a repository of published certificates.

23. A method according to claim 20 wherein the certificate management system comprises a PKI (Public Key Infrastructure).

24. A method according to claim 22 further comprising:
collecting a set of records generated by the certificate management system.

25. A method according to claim 22 further comprising:
maintaining a repository of published certificates in which is stored for each of a plurality of user names a respective certificate in which is identified a respective addressable entity.

26. A method according to claim 22 wherein the addressable entity is an E-mail address.

27. A method according to claim 22 wherein each user name is a distinguished name.

28. A method according to claim 22 further comprising for each certificate storing the respective addressable entity in a certificate extension of the certificate.

29. A method according to claim 28 wherein storing the respective addressable entity in a certificate extension of the certificate comprises storing the respective addressable entity in a subject alternative name extension.

30. A method according to claim 22 further comprising obtaining a new set of records for processing.

31. A method according to claim 30 further comprising storing record reading parameters which determine circumstances under which the new set of records for processing is to be obtained, and obtaining the new set of records for processing in accordance with the record reading parameters.

32. A method according to claim 19 further comprising protecting each notification message by encryption and/or digital signature.

33. A method according to claim 19 further comprising protecting each notification message by encryption and/or digital signature.

34. A method according to claim 22 further comprising verifying authenticity of the respective certificate before sending the notification to the addressable entity obtained from the respective certificate.

35. A method according to claim 19 further comprising maintaining an identification of a language of choice for each user name, before sending a notification to an addressable entity obtained for a particular user name, determining the particular user name's language of choice and including a translation of text in the notification message into the language of choice.

36. An apparatus comprising:
a record-user mapping memory structure which associates for each of a plurality of record identifiers a respective one or more user names;
a receiving interface for receiving a set of records to be processed for remote notification, each record having a respective record identifier;
a notification interface adapted to send messages to addressable entities;
a record processing entity adapted to process the set of records by obtaining the record's record identifier's respective one or more user names from the record-user mapping, and for each user name in the record's record identifier's respective one or more user names obtaining from a user name-addressable entity mapping a respective addressable entity and sending a notification of the record to the addressable entity through the notification interface.

37. An apparatus according to claim 36 in combination with the user name-addressable entity mapping from each user name to the respective addressable entity.

38. An apparatus according to claim 36 adapted to perform remote notification of records generated by a certificate management system, wherein the user name-addressable entity mapping is part of a repository of published certificates, and wherein the record processing entity is adapted to obtain the respective addressable entity from a respective certificate stored in the repository of published certificates.

39. An apparatus according to claim 38 wherein the certificate management system comprises a PKI (public key infrastructure).

40. An apparatus according to claim 38 in combination with the repository of published certificates.

41. An apparatus according to claim 38 wherein the addressable entity is an E-mail address, and the notification interface is an E-mail message sending component.

42. An apparatus according to claim 38 further comprising a configuration file adapted to store record reading parameters, wherein the apparatus is adapted to collect through the record receiving interface a new set of records for processing.

43. An apparatus according to claim 36 further comprising:
a target record memory structure adapted to contain an identification of at least one record identifier for which target record processing is to be performed;
wherein the record processing entity is further adapted to process each record identifier for which target record name processing is to be performed by reading from the associated record a target user name, obtaining from the user name-addressable entity mapping a respective addressable entity for the target user name and sending a notification of the record to the addressable entity.

44. An apparatus according to claim 38 further comprising:
a target record memory structure adapted to contain an identification of at least one record identifier for which target record processing is to be performed;
wherein the record processing entity is further adapted to process each record identifier for which target record processing is to be performed by reading from the associated record a target user name, obtaining from the repository of published certificates a respective addressable entity for the target user name and sending a notification of the record to the addressable entity.

45. An apparatus comprising:
a receiving interface for receiving a set of records to be processed for remote notification, each record having a respective record identifier;
a notification interface adapted to send message to addressable entities;
a target record memory structure adapted to contain an identification of at least one record identifier for which target record processing is to be performed;
a record processing entity adapted to process each record in the set of records having a record identifier for which target record name processing is to be performed by reading from the record a target user name, obtaining from a user name-addressable entity mapping a respective addressable entity for the target user name and sending a notification of the record to the addressable entity.

46. An apparatus according to claim 45 wherein the user-name addressable entity mapping comprises a repository of published certificates which contains for each user name a respective addressable entity.

47. An apparatus according to claim 46 in combination with the user name-addressable entity mapping from each user name to the respective addressable entity.

48. An apparatus according to claim 46 adapted to perform remote notification of records generated by a certificate management system.

49. An apparatus according to claim 48 wherein the certificate management system comprises a PKI (Public Key Infrastructure).

50. An apparatus according to claim 46 wherein the addressable entity is an E-mail address, and the notification interface is an E-mail message sending component.

51. An apparatus according to claim 46 further comprising a configuration file adapted to store record reading parameters, wherein the apparatus is adapted to collect through the record receiving interface a new set of records for processing in accordance with the record reading parameters.

* * * * *